March 30, 1948.　　　　D. E. STEVENS　　　　2,438,685
METHOD FOR JOINING THERMOPLASTIC PIECES
Filed Sept. 20, 1943
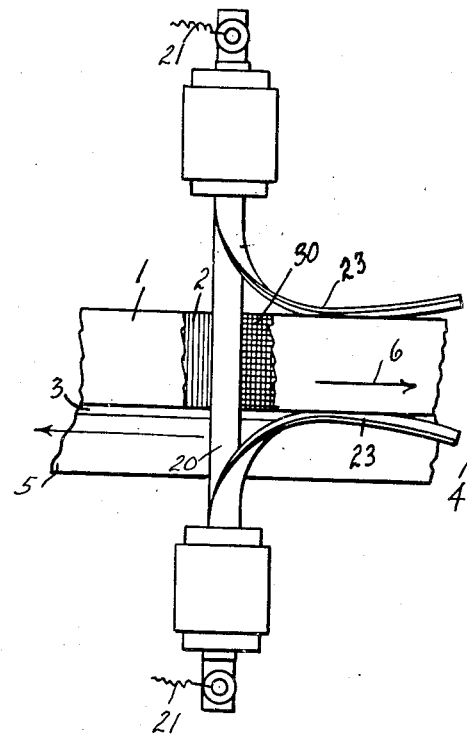
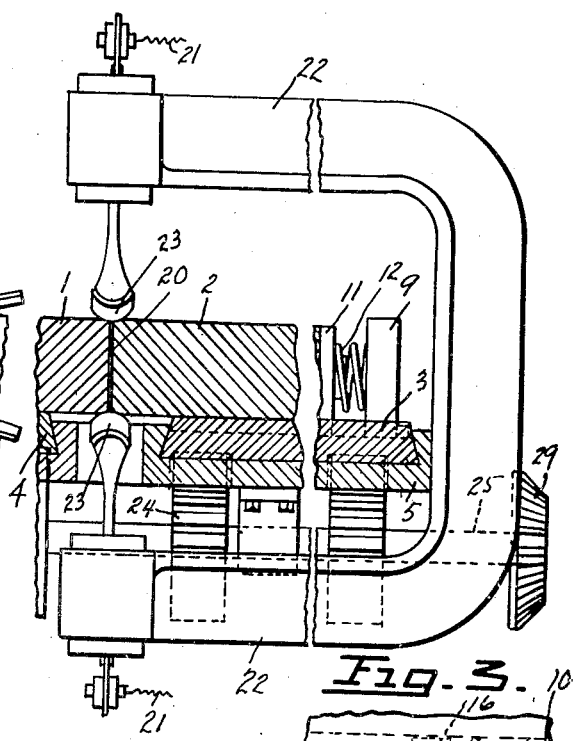
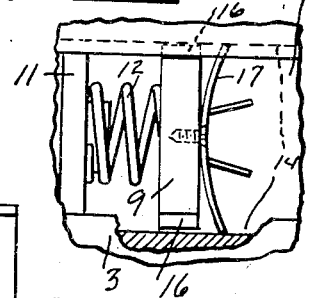
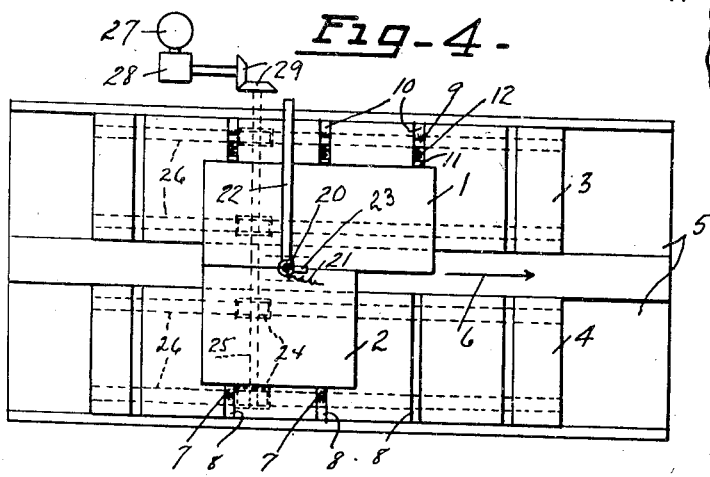
INVENTOR.
DON E. STEVENS.
BY
Boyken, Mohler & Beckley
ATTORNEYS.

Patented Mar. 30, 1948

2,438,685

UNITED STATES PATENT OFFICE 2,438,685

METHOD FOR JOINING THERMOPLASTIC PIECES

Don E. Stevens, South San Francisco, Calif., assignor to Hammond Aircraft Company, South San Francisco, Calif.

Application September 20, 1943, Serial No. 503,168

3 Claims. (Cl. 154—42)

This invention relates to a method of joining pieces of thermoplastic material together, and to a means for use in carrying out said method.

One of the objects of the invention is the provision of a simple, quick and economical method for joining pieces of thermoplastic material together to form a neat and strong connection between such pieces, and which method includes the step of progressively fusing the adjoining surfaces of the pieces together without the use of a chemical solvent.

Another object of the invention is the provision of a suitable and improved means for use in practicing the method of this invention.

This invention is particularly concerned with the thermoplastics rather than the thermosetting plastics. Heretofore the joining of thermoplastic pieces has been done through the use of a solvent, but this method is relatively slow and complicated, particularly with respect to the acrylics. With the present invention, no chemical solvents are used and the thermoplastic pieces are quickly and effectively joined and are ready for safe handling in a shorter time than where they are joined by the use of solvents.

In the drawings,

Fig. 1 is an elevational view of a portion of a device that may be used, the elements thereof being exaggerated for purpose of clarity.

Fig. 2 is a part sectional, part elevational view of the device of Fig. 1.

Fig. 3 is an enlarged, part sectional view showing one of the stop members in the device.

Fig. 4 is a diagrammatic plan view of a substantially complete apparatus that may be used, including the devices of Figs. 1, 2.

In detail, the two pieces of thermoplastic material to be joined together are designated 1, 2, and these may be positioned on a carriage such as tables 3, 4 (Fig. 4) with their adjoining edges together along a line spaced between the tables. The carriage comprising said tables, may be movable in one direction in ways formed in a bed 5 thus moving the pieces 1, 2 along a path 6 longitudinally of a line coincident with the adjoining edges of the pieces 1, 2.

Adjustable stop members 7 movable in grooves 8 in table 4 transversely of its direction of movement may be positioned relative to piece 2 for proper positioning of the free edge of said piece that is between said tables and that is to be joined to a free edge of piece 1, while similar stop members 9 in grooves 10 on table 3 may hold elements 11 in yieldable engagement with the edge of piece 3 adjacent thereto, as by means of springs 12 interposed between stop members 9 and elements 11, so that the adjoining edges of the pieces 1, 2 will be yieldably urged toward each other at all times during the travel of the pieces in path 6.

The sides of grooves 8, 10 may be slotted as at 14 (Fig. 3) for slidably receiving lateral projections 16 on stops 9 (and 7) and a finger compressible bowed leaf spring 17 secured to each of the stops 9, 10 is adapted to expand for engaging the bottoms of slots 14 to thereby automatically lock stops 9, 10 at any desired point in the grooves 8, 10 respectively against moving away from pieces 1, 2. Finger engageable portions struck from the spring 17 as seen in Fig. 3 are adapted to be moved toward each other for flexing the spring and releasing the stops for manual movement thereof away from the plastic pieces.

Extending transversely of the plane of pieces 1, 2 and across the line of juncture between said pieces is a relatively thin blade-like electrical resistance element 20 of non-corrosive metal in an electrical circuit 21 provided with the conventional controls (not shown) for regulating the degree to which the element 20 is heated when the circuit is closed. The plane of element 20 coincides with the plane of the adjoining edges of pieces 1, 2.

The element 20 may be secured in position between the free ends of arms 22 that extend below and above the bed 5 and that may be secured thereto rigid therewith.

Connected with element 20 for conduction of heat therefrom are a pair of resilient heaters 23 that are in the same plane as that in which element 20 and the adjoining edges of pieces 1, 2 are disposed.

The carriage for pieces 1, 2 or tables 3, 4 are adapted to be simultaneously moved in the path 6 by any suitable means such as gears 24 on shaft 25 that is carried by bed 5 or its frame, and which gears are respectively in mesh with racks 26 on said tables. A motor 27 may drive the gears 24 through a speed changer 28 and intermeshing gears 29 (Fig. 4).

As seen in Fig. 2, the heaters 23 are preferably adapted to lie above and below the adjoining edges of pieces 1, 2 in opposed relation, and said heaters have convex opposed surfaces so that the pressure exerted by them upon movement toward each other will be more or less localized at the sides of pieces 1, 2 directly at their adjacent edges.

In operation, upon pieces 1, 2 being moved in path 6 (Fig. 4) the hot electrical element 20 will pass between the adjoining edges of said pieces and will melt the opposed edge surfaces, and immediately thereafter the heaters 23 will pass over the opposite outer surfaces of the pieces at said edges to keep the pieces sufficiently soft where they tend to cool most rapidly, thereby insuring a knitting or flowing together of the flowable film (Fig. 1) on said opposed surfaces of the adjoining edges of the pieces.

The heaters 23 also tend to force the molten material inwardly toward the center of the adjoining edges.

The speed at which the pieces are moved along path 6 is dependent upon the temperature of the element 20 and the kind of plastic. The hotter the latter, the faster the movement may be, but preferably the temperature of the element does not exceed about 300° F. for the acrylics, such as methyl methacrylate, although the temperature may be about 450° F., at which temperature the methyl methacrylate is flowable. For cellulose acetate, polystyrene, and the polyvinyl copolymers about the same temperatures may be used, and in the case of cellulose acetate, a fire retardant plasticizer should be used. With the polyvinyl copolymers, the heaters 23 are preferably chromium plated if there is any likelihood of their containing ferrous metals. The above temperatures are not to be considered restrictive, the important temperature being that which will quickly melt a relatively thin surface layer of the plastic material on the adjoining edges of the pieces of such material when said pieces are moved at a uniform speed of say about 10 to 15 feet per minute for pieces up to about one-half inch thicknesses.

It is quite desirable that the pieces being joined be yieldably urged toward each other during the heating of the adjoining surfaces, and that whatever speed of movement is used be uniform. The knit or weld following a heating of the adjoining surfaces quickly cools, and the joined pieces can be handled with safety in a much shorter period of time than where solvents are used. The use of a relatively thin blade-like electrical heating element is highly desirable since it is most desirable that only sufficient material be melted to form a weld or mixing of the molten material on the opposed edges of the pieces. Also, with a thin element there is less resistance.

Whether the pieces 1, 2 are moved or the heating element is moved instead, is not material, one being the reverse of the other, and the claims are intended to cover the step of moving the element.

Having described my invention, I claim:

1. The method of joining pieces of thermoplastic material that comprises the steps of arranging a pair of said pieces having similar opposed surfaces with said surfaces in engagement with each other, yieldably urging said surfaces into engagement and then, while so urging said surfaces, fusing said surfaces together by passing a member between said surfaces at a temperature above the melting point of said material, and finally heating the material of said pieces at opposite edges of said surfaces after said surfaces have been so fused together.

2. The method of joining pieces of thermoplastic material that comprises the steps of arranging a pair of said pieces having similar opposed surfaces with said surfaces in engagement with each other, yieldably urging said surfaces into engagement with each other and then, while so urging said surfaces, fusing said surfaces together by passing a member between said surfaces at a temperature above the melting point of said material.

3. A method of securing a surface portion of a thermoplastic resin body to an opposed confronting surface portion of another body, which comprises positioning heating means between the confronting portion of said bodies, said heating means extending from one side edge to the other side edge of said portions, advancing said heating means along the course defined by said confronting portions and while in contact with both such portions for the full width of the confronting area, maintaining said heating means at a temperature which will melt but without chemically decomposing the resin surface adjacent said heating means, and causing said melted resin of said thermoplastic body to flow in behind said advancing heating means and fuse on said other body.

DON E. STEVENS.

REFERENCES CITED

The following references are of record in the file of this patent:

UNITED STATES PATENTS

| Number | Name | Date |
|---|---|---|
| 1,970,396 | Scherer | Aug. 14, 1934 |
| 2,156,441 | Watson et al. | May 2, 1939 |
| 2,220,545 | Reinhardt | Nov. 5, 1940 |
| 2,293,568 | Snyder | Aug. 18, 1942 |
| 2,322,298 | Johnston | June 22, 1943 |
| 2,343,106 | Carney | Feb. 29, 1944 |
| 2,360,950 | Kilgour | Oct. 24, 1944 |

OTHER REFERENCES

Ser. No. 391,802, J. Custers (A. P. C.) published April 27, 1943.